UNITED STATES PATENT OFFICE.

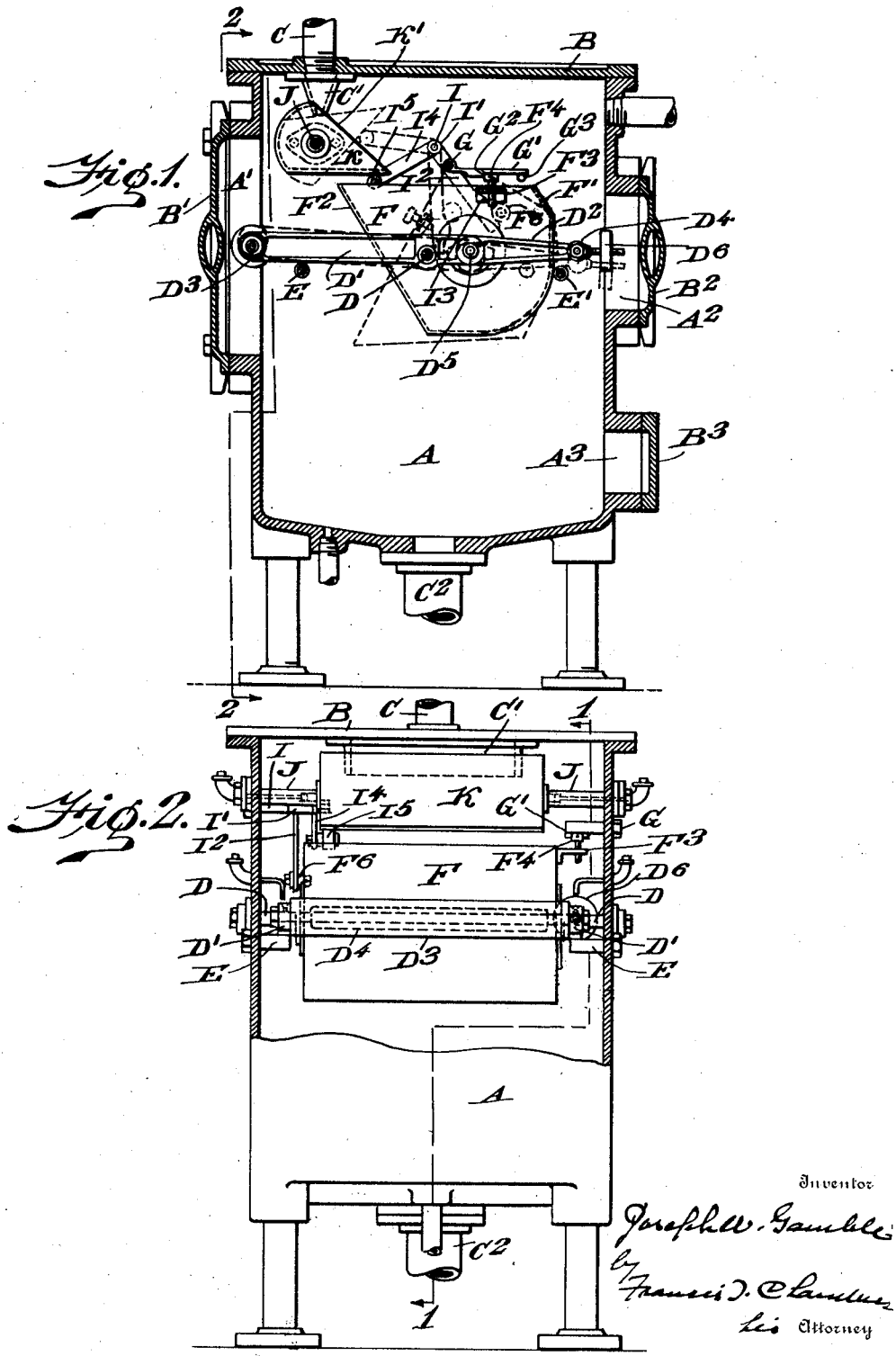

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM-NAME OF HARRISON SAFETY BOILER WORKS, OF PHILADELPHIA, PENNSYLVANIA.

LIQUID-WEIGHING APPARATUS.

1,312,902.   Specification of Letters Patent.   Patented Aug. 12, 1919.

Application filed October 5, 1918. Serial No. 256,964.

*To all whom it may concern:*

Be it known that I, JOSEPH W. GAMBLE, a citizen of the United States of America, and resident of the city and county of Philadelphia, in the State of Pennsylvania, have invented certain new and useful Improvements in Liquid-Weighing Apparatus, of which the following is a true and exact description, reference being had to the accompanying drawings, which form a part thereof.

My invention relates to liquid weighing apparatus and has for its object to provide mechanism whereby a single weighing receptacle, which is alternately charged and discharged with the liquid to be weighed, can be utilized to weigh a continuously flowing liquid; and, broadly speaking, my invention consists in providing between the source of liquid supplied and the liquid weighing receptacle an intermediate receptacle which, when the weighing receptacle is in receiving position, serves simply as a conduit, but which is capable of serving as a receiver and container of liquid and which, when the mechanism for discharging the weighing receptacle comes into operation, is actuated to serve as a receiver and container.

The nature of my invention will be best understood as described in connection with the drawings in which it is illustrated and which show my invention as applied to weighing apparatus of the general character shown and described in the patent to Anderson 1,256,193 of February 12, 1918.

In the drawings:

Figure 1 is a side elevation of the apparatus taken on the line 1—1 of Fig. 2, and Fig. 2 is an elevation of the apparatus on the line 2—2 of Fig. 1.

A is the tank or receptacle in which the weighing apparatus is located. As shown, it is provided with openings at $A'$ $A^2$ and $A^3$. B is a cover plate for the top of the tank, and $B'$, $B^2$ and $B^3$ are covers for the openings above referred to. C is a conduit through which liquid is admitted to the tank, and, as shown, it terminates in the tank in a broad mouth piece $C'$. $C^2$ is the outlet at the bottom of the tank. D D are bearings secured to opposite sides of the tank A and supporting the scale beams $D'$ $D^2$, which are connected with each other at one end by the counter weight $D^3$ and at the other end by a cross connection $D^4$, $D^6$ indicating an adjustable weight for adjusting the balance of the scale beams. E and $E'$ represent stops for limiting the rocking movements of the scale beams. At $D^5$ on the side $D^2$ of the scale beams is pivotally supported the weighing receptacle F, which is formed in such a way that when empty the weight of the side $F'$ will be greater than that of the side $F^2$, and when charged with liquid to a designed limit the weight of the charge receptacle will be greater on the side $F^2$ than on the side $F'$. $F^3$ indicates a bracket on one side of the receptacle F which supports an adjustable stop pin indicated at $F^4$, and $F^5$ indicates a pin projecting from one side of the receptacle F. G is a pivot pin projecting from one side of the casing and supporting a stop bar $G^2$, the opposite end of which rests on a pin $G^3$, and which is in position to engage the stop pin $F^4$ when the receptacle F is in its upper position. I is a pivot pin projecting from one side of the tank A and supporting a rock shaft $I'$, having a lever arm $I^2$ extending into the path of a pin $F^6$, secured to the side of the receptacle F, the lever arm $I^2$ being preferably formed with a cam surface $I^3$ where the pin $F^6$ engages. A second lever arm $I^4$ is provided with a roller $I^5$ at its end, which roller extends under and supports an intermediate charging receptacle indicated at K, pivotally supported by trunnions J J and located in an intermediate position between the mouth piece $C'$ of the conduit C and the weighing receptacle F.

It will be understood that the receiving position of the weighing receptacle F is shown in full lines in Fig. 1 and its discharging position in dotted lines. The corresponding positions of the levers $I'$ and $I^4$ are also shown in full and dotted lines, and the corresponding positions of the receptacle K are also shown in full and dotted lines.

When the receptacle F is empty the scale beams $D'$ $D^2$ are in the positions shown in full lines, and the stop pin $F^4$ is engaged by the latch $G^2$, as shown, the roller $I^5$ is in its lowermost position, as shown in full lines, and the receptacle K, resting on this roller, is tilted so that liquid flowing into it from the mouthpiece C' will flow through it simply as a conduit into the receptacle F. When the weight of liquid accumulating in the receptacle F becomes sufficient to overcome the weight of the counter weight $D^3$ the scale beam $D'$ $D^2$ will be shifted to the positions shown in dotted lines, causing the receptacle F to move downward to a sufficient extent to disengage the latch pin $F^4$ from the latch $G^2$, whereupon, and since accumulating liquid in the receptacle F shifts the center of gravity of the receptacle and its contents, through the side $F^2$ on the pivots $D^5$ the weighing receptacle will tilt to the position shown in dotted lines and discharge its contents. As the receptacle F turns on its pivots the pin $F^6$, acting on the cam surface $I^3$ of the lever $I^2$, will shift that lever and the connected lever $I^4$ to the position shown in dotted lines, raising the supporting roller $I^5$ and shifting the intermediate container K to the position shown in dotted lines, in which position it will not only receive but will retain the fluid flowing into it from the mouth piece C', the container being made of sufficient capacity to hold the liquid which will flow from the mouth piece during the time when the weighing receptacle is being discharged.

It is obvious, of course, that as the liquid is delivered from the weighing receptacle F the decreasing weight will cause the return of the scale beams to their initial positions, as shown in full lines, and that after liquid is discharged from the receptacle it will turn back to receiving position, as shown in full lines, whereupon the lever arms $I^2$ $I^4$, and the supporting roller $I^5$ will also be returned to the positions shown in full lines and the intermediate receptacle K shifted to position to discharge its contents into the receptacle F, in which position it will remain until the receptacle F is again discharged.

It will be understood that while I have shown my invention in what I believe to be its best and most effective embodiment it is capable of application in many forms and modifications of apparatus, and except where my claims are specifically limited to the illustrated construction they are not to be understood as in any wise so limited.

Having now described my invention, what I claim as new and desire to secure by Letters Patent, is:

1. In a liquid weighing apparatus, the combination of a receptacle into which the liquid is delivered and in which it is weighed, means actuated by the weight of liquid in the receptacle for discharging it intermittently, a conduit through which liquid is delivered to the apparatus, an intermediate pivotally supported liquid receptacle located between said conduit and the weighing receptacle and serving normally, and while the weighing receptacle is being filled, as a mere conduit, and means actuated by the means which effect the discharge of the weighing receptacle whereby the intermediate receptacle is turned to a liquid retaining position and held in such position while the weighing receptacle is being discharged.

2. In a liquid weighing apparatus, the combination of a liquid weighing receptacle pivotally supported on weighing mechanism and arranged to turn and deliver its contents when it attains a determined weight with a conduit for delivering liquid to the apparatus, and an intermediate pivotally supported receptacle arranged to receive liquid from the conduit and deliver it into the weighing receptacle, said intermediate receptacle being normally in position to serve as a mere conduit, and means actuated by the turning of the weighing receptacle to discharge portions for turning the intermediate receptacle to a liquid retaining position.

JOSEPH W. GAMBLE.

Copies of this patent may be obtained for five cents each, by addressing the "Commissioner of Patents, Washington, D. C."